(12) United States Patent
Bayraktaroglu et al.

(10) Patent No.: US 12,399,006 B2
(45) Date of Patent: Aug. 26, 2025

(54) AGITATION MONITORING SYSTEM FOR PLATING PROCESS

(71) Applicant: Intel Corporation, Santa Clara, CA (US)

(72) Inventors: Adrian Bayraktaroglu, Chandler, AZ (US); David Lampner, Chandler, AZ (US); Darko Grujicic, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 715 days.

(21) Appl. No.: 17/702,839

(22) Filed: Mar. 24, 2022

(65) Prior Publication Data

US 2023/0304795 A1    Sep. 28, 2023

(51) Int. Cl.
*G01C 19/56* (2012.01)
*C23C 18/16* (2006.01)
*C25D 17/26* (2006.01)
*C25D 21/10* (2006.01)

(52) U.S. Cl.
CPC .......... *G01C 19/56* (2013.01); *C23C 18/1628* (2013.01); *C23C 18/1669* (2013.01); *C23C 18/1675* (2013.01)

(58) Field of Classification Search
None
See application file for complete search history.

(56) References Cited

U.S. PATENT DOCUMENTS

| | | | | |
|---|---|---|---|---|
| 1,030,053 | A * | 6/1912 | Catlin | C25D 17/20 204/213 |
| 8,905,624 | B1 * | 12/2014 | Howe | B01F 31/89 366/115 |
| 2006/0187743 | A1 * | 8/2006 | Carreras | B01F 31/24 366/601 |
| 2012/0199475 | A1 * | 8/2012 | McHugh | C25D 17/001 366/343 |
| 2017/0296054 | A1 * | 10/2017 | Goldstein | A61B 5/0008 |
| 2022/0010452 | A1 * | 1/2022 | Nair | C25D 17/12 |

* cited by examiner

*Primary Examiner* — Alexander M Weddle
(74) *Attorney, Agent, or Firm* — Viering, Jentschura & Partner mbB

(57) ABSTRACT

The present disclosure is directed to a monitoring system for a plating process using a monitoring device including a metrology component for collecting agitation intensity data on at least one agitation component within a plating equipment and transferring the collected agitation intensity data to a process control station.

17 Claims, 9 Drawing Sheets

AGITATION MONITORING SYSTEM FOR PLATING PROCESS

BACKGROUND

The plating process is an important processing step having applications in substrate, semiconductor and printed circuit board manufacturing. The mechanical agitation used in the plating process plays a large role in ensuring proper chemical material reaction uniformity, mass transport of chemical species and high unit yields. Among the major defects that may be attributed to the plating process is incomplete plating due to insufficient mechanical agitation. This defect is a major factor in reduced yields that may need to be addressed.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which.

DETAILED DESCRIPTION

In the semiconductor packaging industry, organic or glass-based rectangular substrates often undergo a plating process, typically with a view to produce vias as a through-connection. During substrate manufacturing, plating equipment (involving plating with materials such as copper, nickel, gold and palladium) and equipment for pre-treatment steps that use a material carrier (i.e. a panel basket) for the substrate have several different mechanisms of mechanical agitation at each chemical bath station including (but not limited to) shocking, rocking, vibration and ultrasonic. These mechanisms help to improve the plating uniformity, cleaning, enhance mass transport for substrate features (such as a blind hole or a through hole vias) and help to remove any byproducts produced during the chemical process. These mechanisms may apply to plating for substrates as well.

Figure 1A:
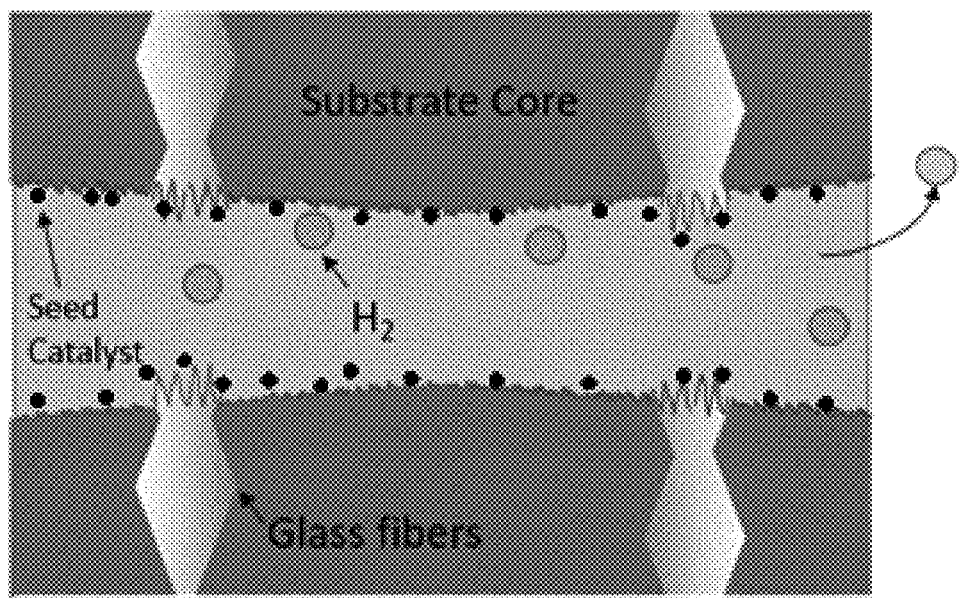
FIG. 1A schematically shows hydrogen generation in a through hole via during an electroless copper deposition process.

For example, as shown in FIG. 1A, in an electroless copper process, hydrogen is generated during the oxidation of formaldehyde (Equation (1)). Mechanical agitation of at least parts of the plating equipment is necessary to even out the seed catalyst in the chemical bath, which, in turn, helps to reduce the amount of hydrogen incorporated in the deposited copper film as well as to prevent plating voids in through hole vias due to incomplete plating.

$$Cu^{2+}+2HCHO+4HO^-\rightarrow Cu+2HCOO^-+2H_2O+H_2\uparrow \quad \text{Equation (1)}$$

Thus, in FIG. 1A, the seed catalyst is depicted to attach to the substrate core and the glass fibers, necessary for forming the plating. During the chemical reaction to reduce the copper ions into elementary copper using formaldehyde and hydroxide, gaseous hydrogen ($H_2$) is formed. Mechanical agitation is necessary for elimination of the gaseous hydrogen, since it blocks the attachment of the seed catalyst on the substrate core and the glass fiber.

Figure 1B:
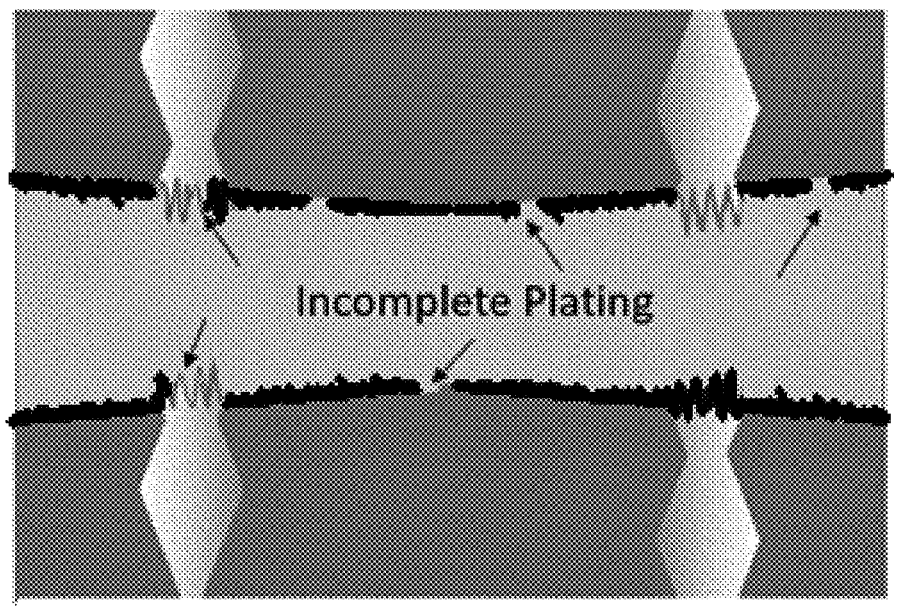
FIG. 1B schematically shows incomplete plating in a conventional plating process due to insufficient mechanical agitation.

The consequence of insufficient mechanical agitation may be seen in FIG. 1B, which shows gaps or voids where the seed catalyst was unable to facilitate the plating to the substrate core and the glass fibers, because it was blocked by the gaseous hydrogen. Similarly, insufficient mechanical agitation may result in poor chemical mass transport, causing an uneven distribution of the seed catalyst and/or plating chemical species, thereby creating an uneven plating pattern. Hence, without mechanical agitation, the substrate may be subjected to incomplete plating, which may result in a loss in yield.

Mechanical agitation of the plating equipment may employ an equipment agitation system that provides a combination of rocking through an electrical motor and an intermittent vertical acceleration (e.g., vertical shocking) using a shocking system, for example, pneumatic actuators. The mechanical agitation may be measured in force per unit mass due to gravity at the earth's surface (in the unit "g"). However, over time, the shocking system has been known to degrade due to dirt and oil build-up in the equipment agitation system, which may result in decreased shocking or unsynchronized shocking on either side of the equipment agitation system or even unexpected actuator failure, resulting in the above insufficient mechanical agitation. The performance of the mechanical agitation is typically unmonitored or unchecked, except for periodic maintenance or due to observed, noticeable inadequate performance.

For example, if the mechanical agitation is monitored, it is conventional performed in a qualitative manner, by institutional memory, yield experimentation and/or complex fluid dynamic models, whereas collection of quantitative data on the performance of the equipment agitation system to monitor the same may require invasive mechanisms that may inhibit the otherwise continuous plating process line. Such monitoring mechanisms may include having hot wire sensors attached to a test apparatus, which may be connected through an analog to digital controller to a computer. These conventional methods of monitoring are cumbersome, indirect, do not take into account system degradation or sudden failure of the equipment agitation system, are inflexible when characterizing multiple process tanks (e.g., chemical baths) that are used in plating process lines and cannot accurately mimic conditions during a real plating process line.

To address the above insufficiency, the present disclosure provides a system to monitor (and characterize) the mechanical agitation for enhanced process control and plating performance with realtime measurement and statistical process control of the equipment agitation system for the plating equipment. In turn, the substrate vias and/or laser through hole vias plating coverage may be improved by the monitoring and control. Moreover, incomplete plating due to poor chemical mass transport or chemical byproducts such as hydrogen may be prevented. Since the agitation intensity data may be collected in realtime, it may be possible to immediately detect any malfunctioning of the mechanical agitation during the plating process. Hence, unlike the conventional monitoring system, the present disclosure may detect a potential malfunction of the equipment agitation system before a periodic maintenance check or a noticeable performance degradation is observed, by which time the malfunctioning may have already caused yield loss in the substrate manufacturing process. By using the monitoring system of the present disclosure, potential yield loss due to insufficient mechanical agitation may thus be avoided.

Figure 2:
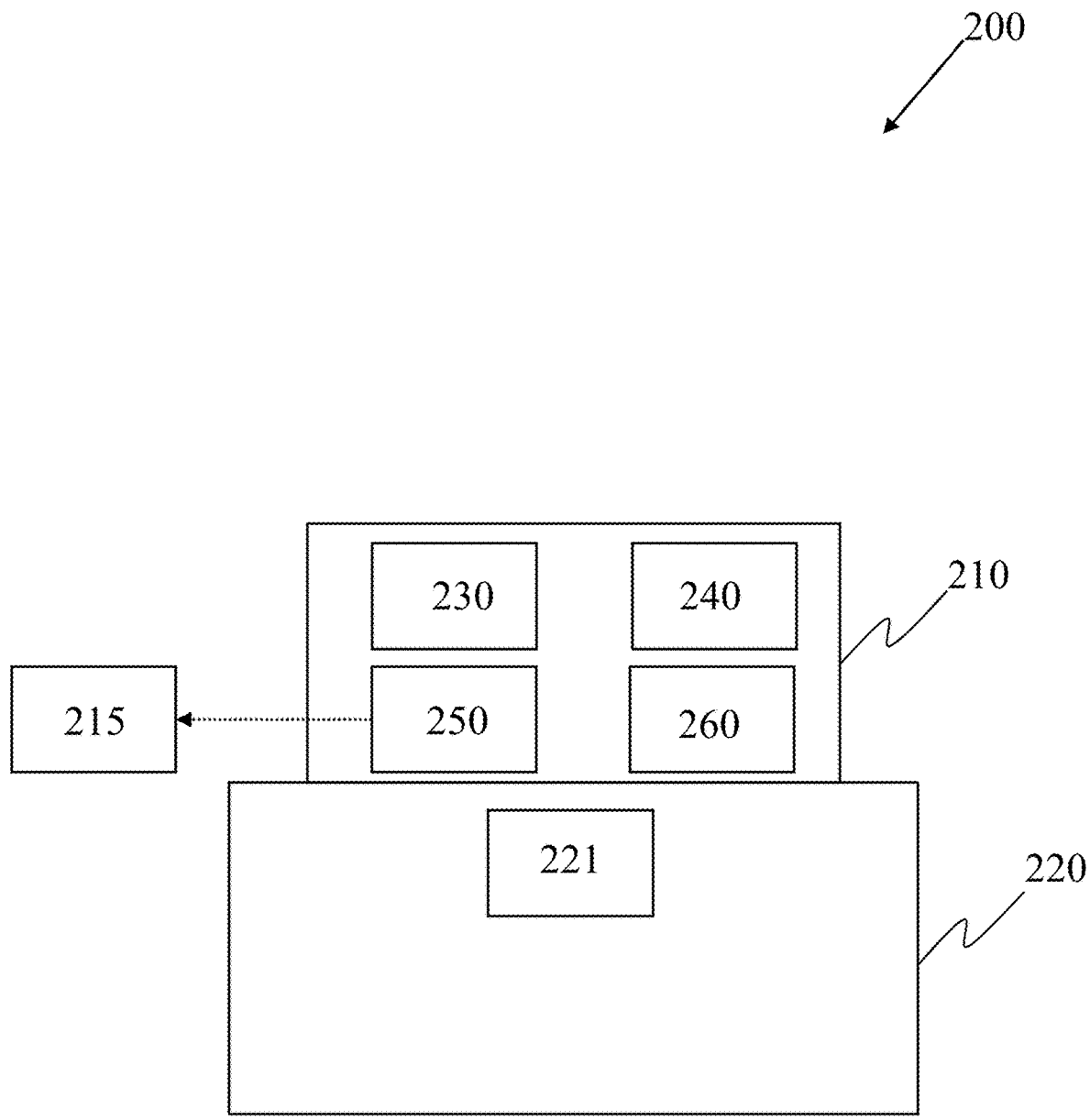
FIG. 2 schematically shows a monitoring system including a monitoring device, a plating equipment and a process control station according to the invention.

Accordingly, in a first aspect, as shown in FIG. 2, there is provided a monitoring system 200 including: a monitoring device 210, a process control station 215 and a plating equipment 220 including at least one agitation component 221. The monitoring device 210 has the function of monitoring the mechanical agitation that is exercised on the at least one agitation component 221 in realtime. The monitoring device 210 may thus be mounted on the at least one agitation component 221 of the plating equipment 220 that is configured to be mechanically agitated and may be mechanically agitated in the same way that the at least one agitation component 221 is agitated.

The plating equipment 220 may include subcomponents (not shown) configured to perform a plating treatment, including a plating pre-treatment. For example, the subcomponents may include chemical baths, or equipment associated with the chemical baths, configured to cause chemical reactions to be carried out on the substrate (not shown) and/or to wash and/or to rinse the at least one substrate. At least one of those subcomponents of the plating equipment 220 may include, or be, the agitation component 221 that is subjected to mechanical agitation.

The process control station 215 may be a workstation or server that is configured to be coupled with the realtime connectivity component 250 to receive the collected agitation intensity data. The process control station 215 may receive collected agitation intensity data from any stage of the various process stages selected from the group consisting of a load stage, an orientation stage, a pre-treatment stage, a plating stage, a recovery stage, and a cleaning stage. Thus, more than one monitoring device 210 may be present in the present monitoring system, each configured to collect agitation intensity data from various process stages and transferring the collected agitation intensity data to the process control station 215. Accordingly, the process control station 215 may be coupled with more than one monitoring device 210 via a realtime connectivity component 250.

The monitoring device 210 may include a metrology component 230 configured to measure and collect agitation intensity data and movement data. The movement data may contain data that allow to characterize, e.g., the shock intensity or vibration and for any one, or any two, or all three dimensions in a space (e.g., in one, two or all three X, Y, Z directions).

The agitation intensity data may contain data on a relative change of a magnetic field of the at least one agitation component 221, in which case the metrology component 230 may be a magnetometer. The agitation intensity data may contain data on a vibration and/or acceleration of motion of the at least one agitation component 221, in which case the metrology component 230 may be an accelerometer. The agitation intensity data may contain data on an angular velocity of the at least one agitation component 221, in which case the metrology component 230 may be a gyroscope. Preferably, the metrology component 230 may be an accelerometer, which may advantageously provide the most accurate agitation intensity data such as the shock intensity in the unit g. The metrology component 230 may include, and/or be configured as, or function as, a movement sensor.

In an aspect, the metrology component 230 may be able to detect agitation intensity data in the range of 0 to 20,000 g or more than 20,000 g, optionally in the range 0 to 10,000 g, optionally in the range 0 to 5,000 g, optionally in the range 0 to 1,000 g, optionally in the range 0 to 100 g, optionally in the range 0 to 50 g. The range of detection of the agitation intensity data may depend on the type of the metrology component 230, e.g., on the accelerometer.

The present monitoring device 210 may include a microcontroller 240. The microcontroller 240 may be configured to collect the agitation intensity data from the metrology component 230 and convert these into a digital version thereof to be forwarded to the process control station 215. Hence, the microcontroller 240 may receive analog signals from the metrology component 230. The microcontroller 240 may pre-process these data to be amplified, filtered, or converted to a discrete and finite digital format for being transmitted to the process control station 215, optionally in a manner that is acceptable for programmable logic control (PLC) communication protocols. In some aspects, the microcontroller 240 may transmit data in the form of a summary statistic to the process control station 215.

In addition, the monitoring device 210 may include a realtime connectivity component 250 configured to transfer the collected agitation intensity data to the process control station 215. The realtime connectivity component 250 may be a wired connection between the microcontroller 240 and the process control station 215. In that case, that wired connection may be connection according to PLC communication protocols. Alternatively, the realtime connectivity component 250 may be carried out using wireless data transmission, in which case the realtime connectivity component 250 may be a Wifi transmitter. Accordingly, the realtime connectivity component 250 may be connected with the microcontroller 240 to transmit the pre-processed data from the microcontroller 240 to the process control station 215.

The monitoring device 210 may include a power source 260. In some aspects, the power source 260 may include a cable power connection between a power socket (not shown) and the monitoring device 210. Alternatively, the power source 260 may be a wireless charger integrated in the monitoring device 210 and configured to be charged periodically. In some aspects, the power source 260 may be a battery. In some aspects, the power source 260 may be inductively charged. Advantageously, when the power source 260 includes a cable power connection between a power socket and the monitoring device 210, a higher reliability, e.g., in an industrial scale monitoring system, may be obtained.

The plating equipment 220 may include an equipment agitation system (not shown), which is configured to mechanically agitate the at least one agitation component 221 of plating equipment 220. The equipment agitation system may provide mechanical agitation in the range of 0 to 20,000 g or more than 20,000 g, optionally in the range 0 to 10,000 g, optionally in the range 0 to 5,000 g, optionally in the range 0 to 1,000 g, optionally in the range 0 to 100 g, optionally in the range 0 to 50 g. The range of mechanical agitation of the equipment agitation system may depend on the type of the actuator.

The monitoring device 210 may be mounted on any component of the plating equipment 220 on which agitation intensity data may be collected, or that is subjected to mechanical agitation.

Advantageously, during manufacturing of the substrates, the monitoring device 210 may collect agitation intensity data such as shock intensity or vibration in the X, Y, Z directions and transmit the agitation intensity data to the microcontroller 240, which may be a PC for data processing of the agitation intensity, and provide summary statistics necessary for proper equipment process control in realtime.

Figure 3:
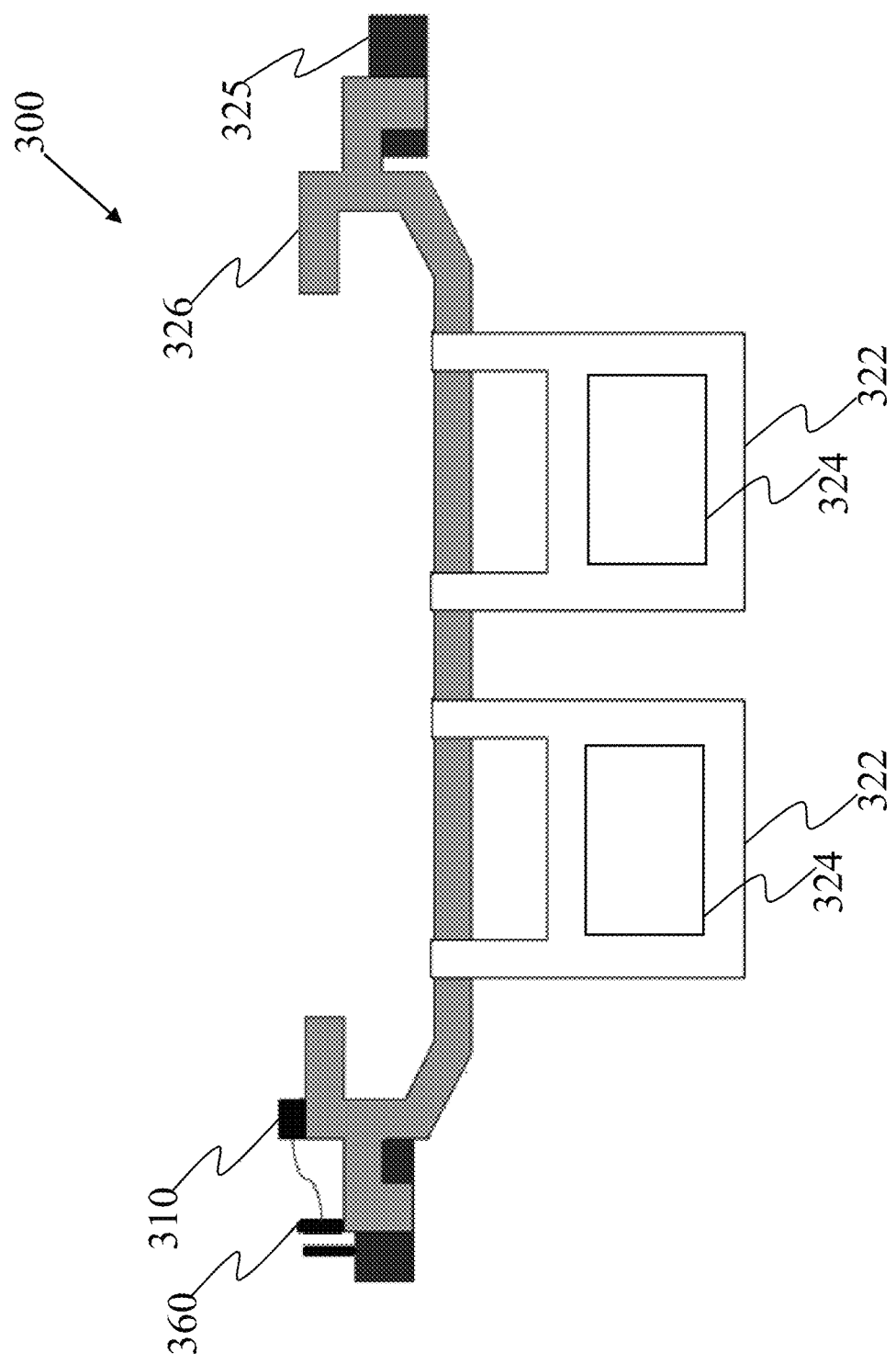
FIG. 3 schematically shows the mounting of the monitoring device on a material flight bar according to the invention.

In some aspects, as shown in FIG. 3, the monitoring system 300 may include a panel basket 322 configured for housing and securing at least one substrate 324 therein. The monitoring system 300 may further include a material flight bar 326 configured to guide the panel basket 322 through various process stages selected from the group consisting of a load stage, an orientation stage, a pre-treatment stage, a plating stage, a recovery stage, and a cleaning stage. The monitoring system 300 may further include a processing fixture 325 configured to support the panel basket 322.

In various aspects, as shown in FIG. 3, the monitoring device 310 may be mounted on the material flight bar 326, that is attached to the processing fixture 325. In these aspects, it is advantageous to combine the monitoring device 310 with a power source 360 that is wireless, since the material flight bar 326 is moving according to the process stages of the plating process. In these aspects, it is also advantageous to combine the monitoring device 310 with a Wifi transmitter as the realtime connectivity component (not shown), such that the data transmission is wireless.

Figure 4:
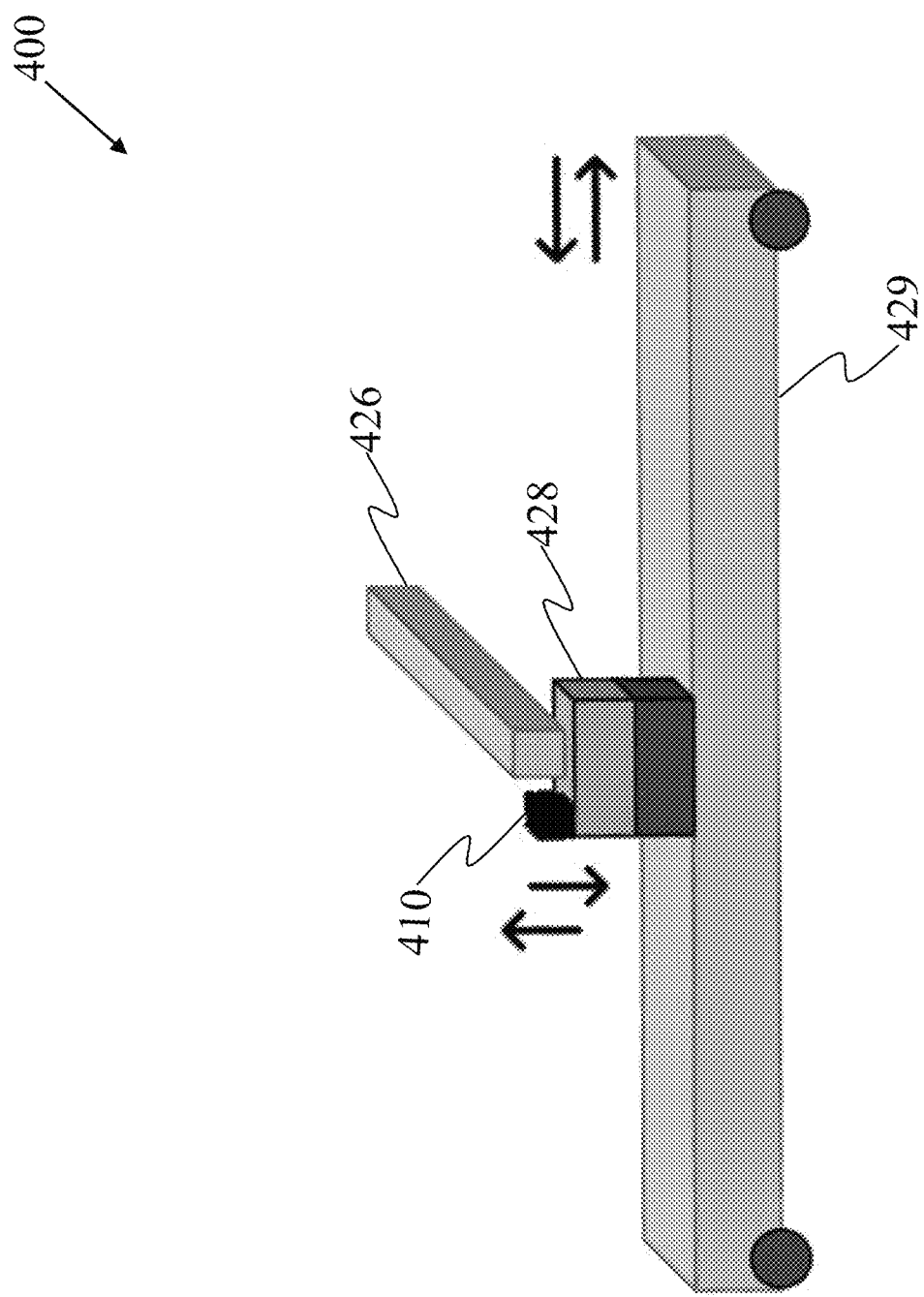
FIG. 4 schematically shows the mounting of the monitoring device on an actuator according to the invention.

In some aspects, as shown in FIG. 4, the equipment agitation system may include an actuator 428 for providing the mechanical agitation. The actuator 428 may be configured to generate motion. The actuator 428 may be selected from the group consisting of a solenoid, a DC motor, a stepper motor, a servo motor, a hydraulic actuator, a pneumatic actuator, and a combination thereof. In various aspects, the monitoring device 410 may be mounted on the actuator 428 that is affixed to a rocking bar 429. The actuator 428 may be attached to the material flight bar 426. Specifically, the monitoring device 410 may be placed on the actuator 428. In this aspect, the monitoring device 410 may be combined with a power source via a cable power connection (not shown), and/or the realtime connectivity component may be a wired data transmission (not shown). Advantageously, mounting the monitoring device 410 on the equipment agitation system, e.g. the actuator 428, may allow for more practical implementation and servicing of the monitoring device 410.

Figure 5:
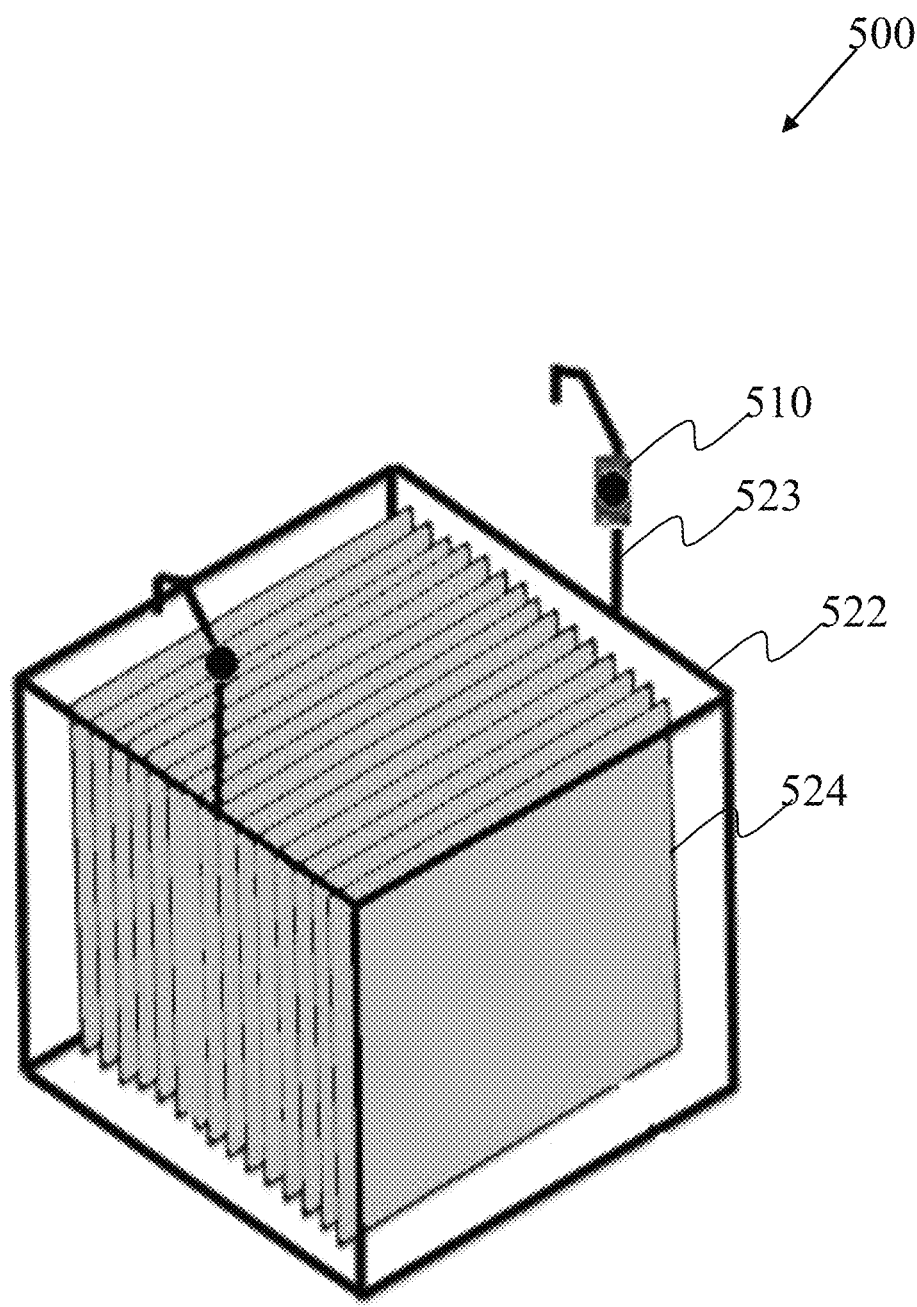
FIG. 5 schematically shows the mounting of the monitoring device on an arm of a panel basket according to the invention.

In some aspects, as shown in FIG. 5, the monitoring device 510 may be mounted on the panel basket 522, configured to secure the at least one substrate 524. Specifically, the monitoring device 510 may be attached to at least one arm 523 of the panel basket 522. Advantageously, the monitoring device 510 thus attached may be able to not only detect malfunctioning of the equipment agitation system (not shown), but would also detect malfunctioning of the mechanical agitation transmission to the panel basket 522. In other words, even in the event that the equipment agitation system functions normal, in case of a defect in the transfer of the mechanical agitation from the equipment agitation system to the panel basket 522, such a defect could also be detected with the mounting of the monitoring device 510 on the panel basket 522 in accordance with this aspect.

In various aspects, there is provided a plating monitoring process 600. The plating monitoring process 600 may include providing a monitoring device and a plating equipment including at least one agitation component. The plating monitoring process 600 may include placing at least one substrate into the plating equipment. The plating monitoring process 600 may include performing plating process steps. The plating process steps may include pre-treatment, plating, recovery, and/or cleaning. The plating process steps may, in some aspects, include an electroless plating process. The plating monitoring process may be advantageously applied to the electroless plating process since mechanical agitation is particularly beneficial in this process. However, the present monitoring process is not limited to such process and may be applied to any process where monitoring mechanical agitation is advantageous to the process. The plating process may include subjecting the at least one substrate to chemical baths configured to cause chemical reactions to be carried out on the at least one substrate and/or to wash and/or to rinse the at least one substrate.

The plating monitoring process 600 may include mechanically agitating the at least one agitation component and the monitoring device. The plating monitoring process 600 may include collecting agitation intensity data using the monitoring device. The plating monitoring process 600 may include transferring the collected agitation intensity data to a process control station. In the plating monitoring process 600, the monitoring device may be described as herein before. Mechanically agitating the plating equipment may include mechanically agitating the at least one agitation component with an equipment agitation system. The equipment agitation system and the agitation intensity data may be described as herein before.

Figure 6:
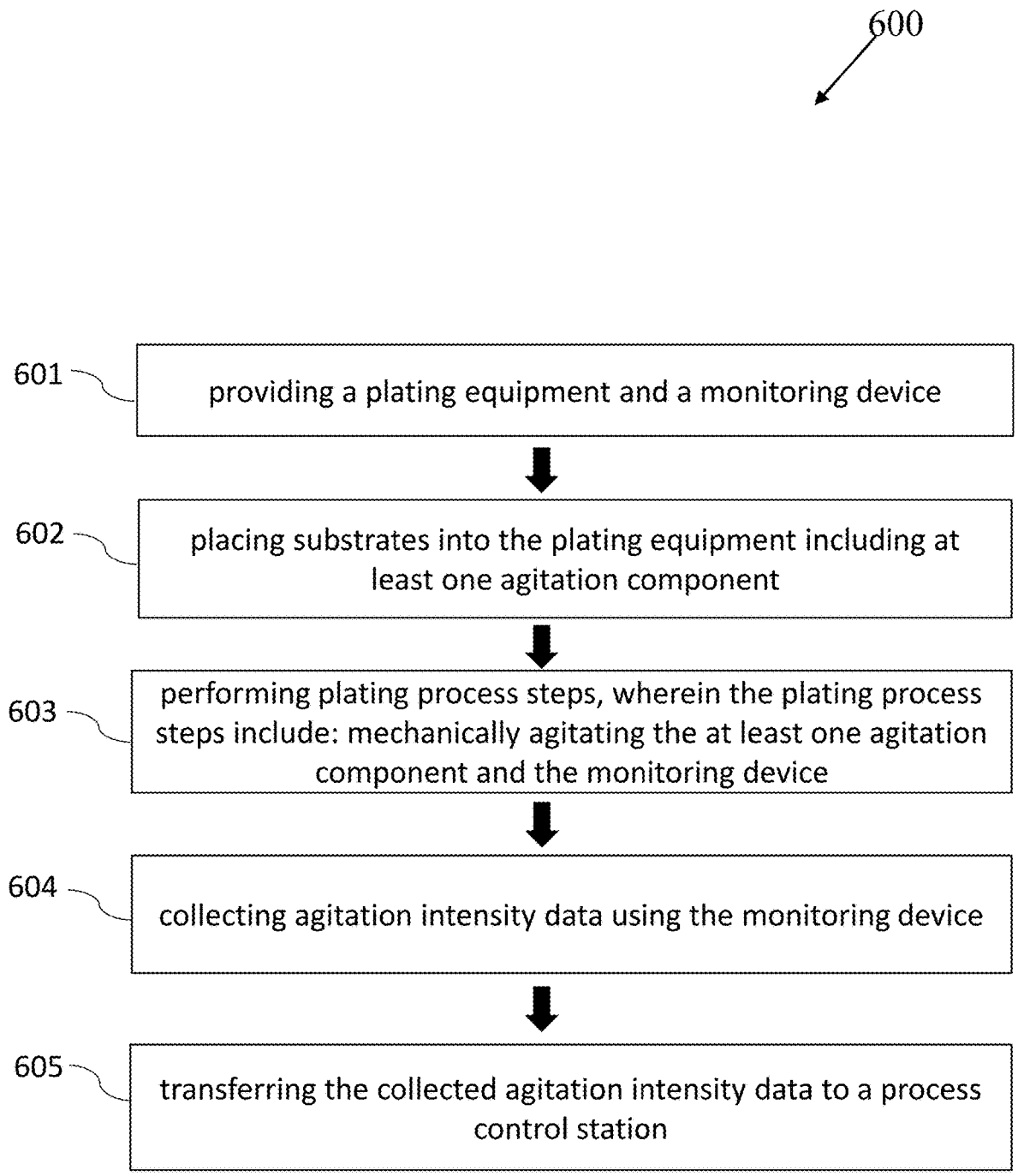
FIG. 6 shows a simplified flow diagram for an exemplary process according to an aspect of the present plating monitoring process.

FIG. 6 shows a simplified flow diagram for an exemplary method according to an aspect of the present plating monitoring process 600.

The operation 601 may be directed to providing a plating equipment and a monitoring device.

The operation 602 may be directed to placing substrates into the plating equipment including at least one agitation component.

The operation 603 may be directed to performing plating process steps, wherein the plating process steps include: mechanically agitating the at least one agitation component and the monitoring device.

The operation 604 may be directed to collecting agitation intensity data using the monitoring device.

The operation 605 may be directed to transferring the collected agitation intensity data to a process control station; wherein the monitoring device may include a metrology component, a microcontroller, a realtime connectivity component and a realtime connectivity component.

At any one time of the plating monitoring process 600, several monitoring devices may be used in parallel within the plating equipment and may be associated to a particular production lot ID and/or internal equipment station. The summarized statistics data (ex. mean and standard deviation) for each internal equipment station, e.g., each material flight bar, or each panel basket, may then be transferred to a process control station which will verify that the equipment agitation system is operating within acceptable system parameters. In other words, the plating monitoring process 600 may further include comparing the agitation intensity data with standard agitation intensity data to detect malfunctioning of the mechanical agitation. In the event of a detected out of control situation, the plating equipment would immediately be stopped from operating. The plating equipment could then be scheduled for maintenance and the affected substrate production material flagged for dispositioning.

Figure 7:
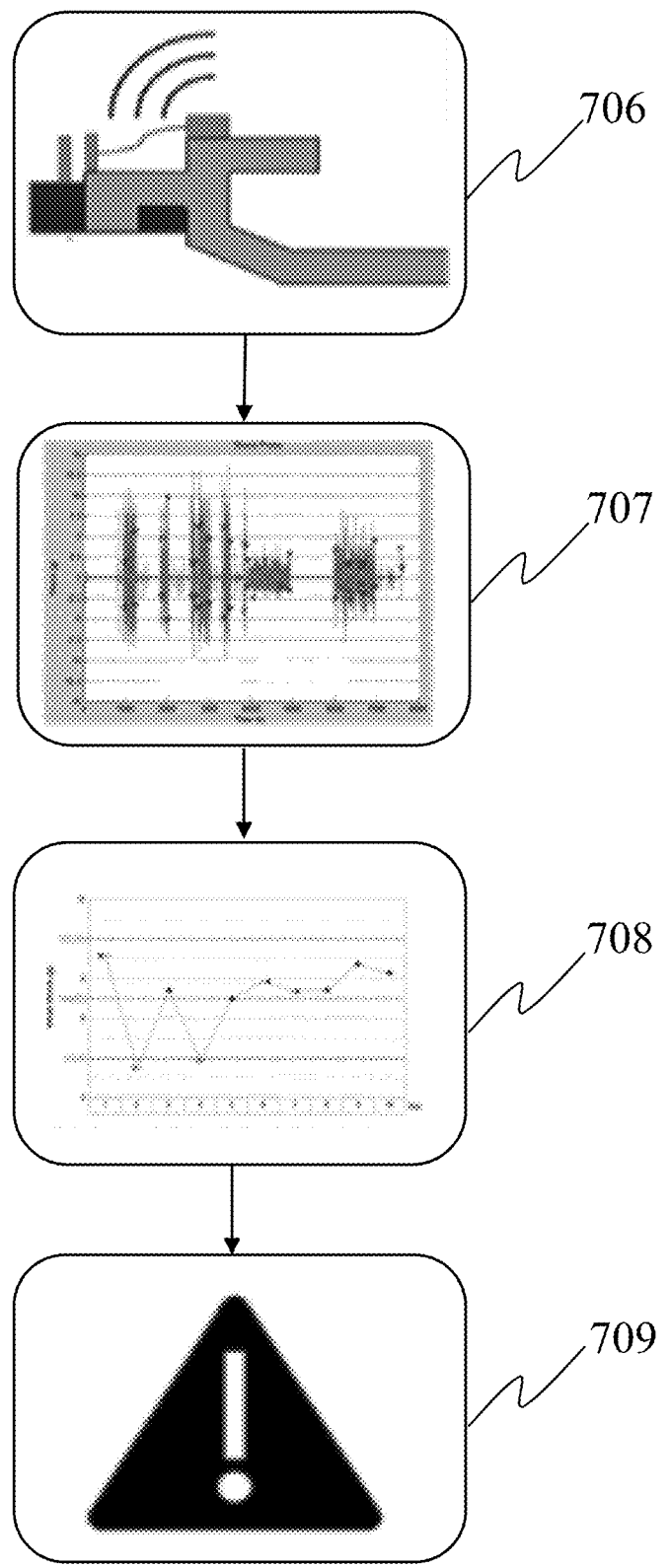
FIG. 7 shows a data processing protocol outlining the processing of the agitation intensity data collected by the monitoring device.

This data processing protocol is further illustrated in FIG. 7. At 706, the monitoring device transmits the agitation intensity data to the microcontroller, exemplary shown as the monitoring device being mounted on the material flight bar, with the realtime connectivity component being a wireless data transmission. At 707, the microcontroller may analyse the agitation intensity data. At 708, the microcontroller may transmit a summary statistics to the process control station. At 709, the process control station may determine that the plating equipment may need to undergo maintenance and remotely stops the plating process steps from further proceeding due to the out of control situation.

Figure 8A:
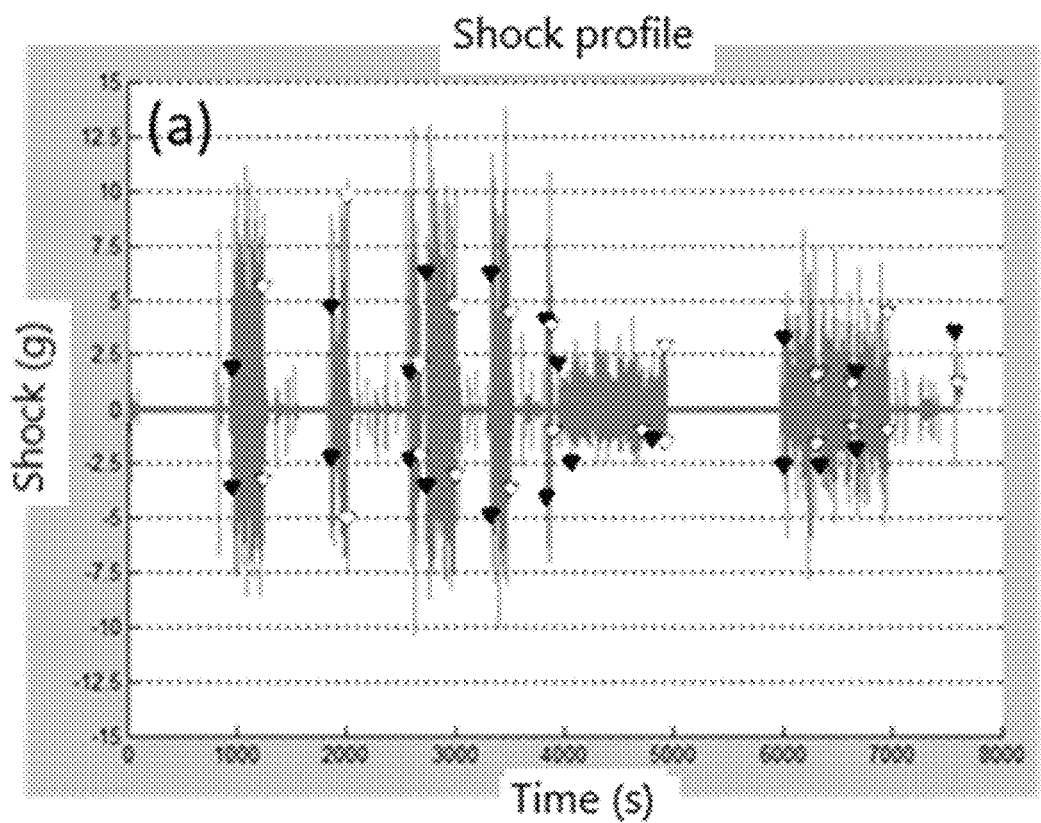
FIGS. 8A, 8B and 8C show representative examples of agitation intensity data collected from the present monitoring device on the plating equipment.
Figure 8B:
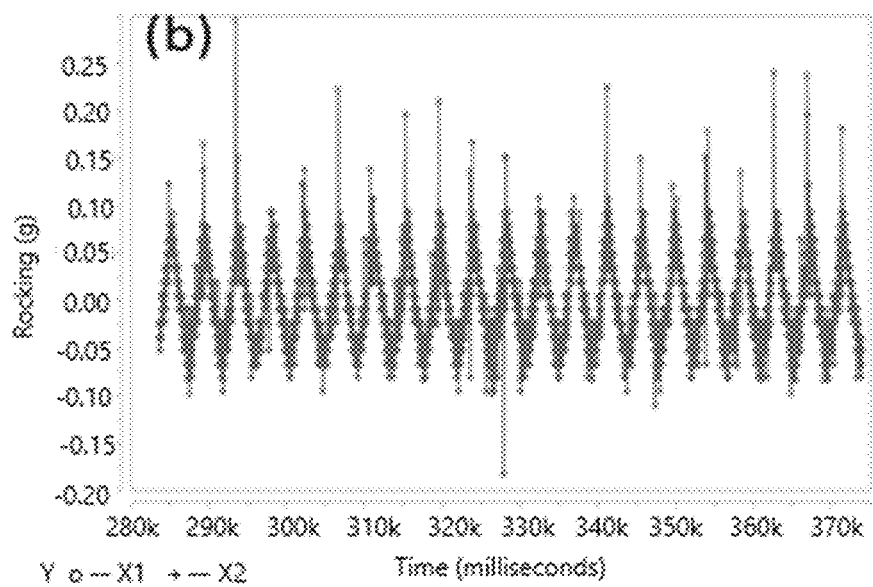
Figure 8C:
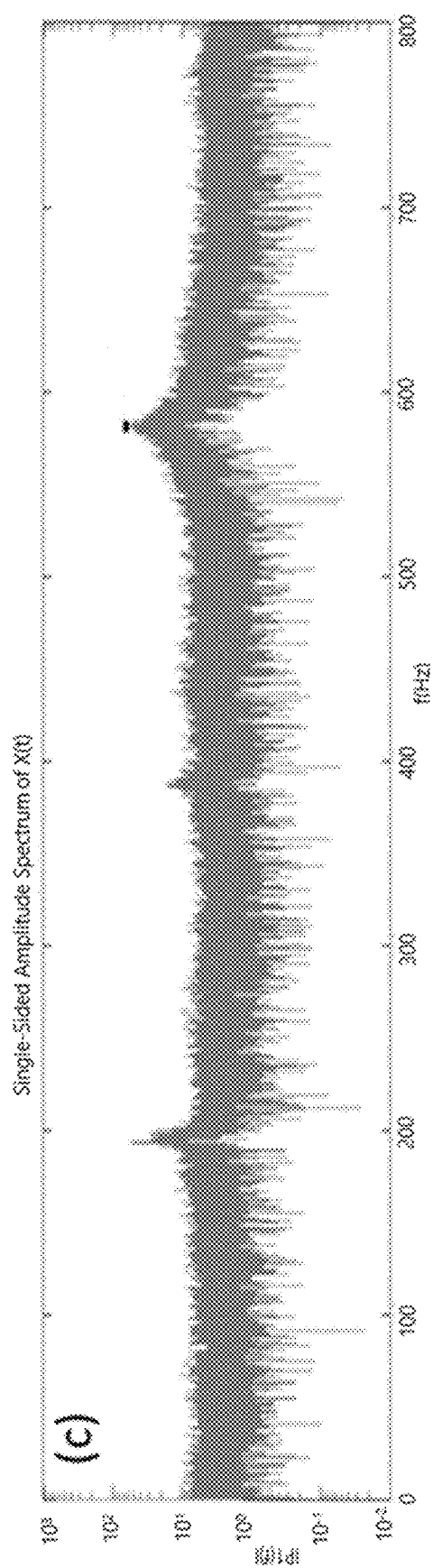

FIGS. 8A, 8B and 8C further illustrate the data processing at the process control station, whereby the data were acquired by a 1.6 kilohertz (kHz) accelerometer; FIG. 8A reflects agitation intensity data collected in the vertical direction (black triangles refer to the start of mechanical agitation, white triangles refer to the end of mechanical agitation), FIG. 8B reflects agitation intensity data collected in the horizontal direction, and FIG. 8C shows the vibration frequency after the agitation intensity data underwent Fourier transformation.

In another aspect, there is provided a non-transitory computer readable medium including instructions that, if executed, cause one or more processors to receive agitation intensity data that are collected by a monitoring device mounted on a plating equipment during a plating process, compare the agitation intensity data with standard agitation intensity data, detecting a deviation of the received agitation intensity data from the standard agitation intensity data and preventing the plating process from proceeding.

The non-transitory computer readable medium may include instructions to carry out a Fourier transformation of the agitation intensity data.

The malfunction of the mechanical agitation may be detected by collection of a baseline and implementation of statistical process control principles. The statistical process control principles may involve applying a statistical limit (e.g., a three-sigma limit, referring to a statistical calculation where the data are within three standard deviations from the baseline); or an engineering limit could be applied when the performance of the plating process is found to be affected by an abnormal agitation value.

In a first example, there is provided a monitoring system including: a plating equipment including at least one agitation component that is configured to be mechanically agitated and a monitoring device, the monitoring device being mounted on the agitation component and including:
- a metrology component configured to collect agitation intensity data,
- a microcontroller;
- a realtime connectivity component configured to transfer the collected agitation intensity data; and
- a power source; and
- a process control station configured to be coupled with the realtime connectivity component to receive the collected agitation intensity data.

In a second example, the metrology component may include an accelerometer, a gyroscope and/or a magnetometer.

In a third example, the plating equipment may further include a material flight bar.

In a fourth example, the monitoring device may be mounted on the material flight bar.

In a fifth example, the plating equipment may further include an equipment agitation system configured to mechanically agitate the plating equipment.

In a sixth example, the monitoring device may be mounted on the equipment agitation system.

In a seventh example, the plating equipment may include a panel basket.

In an eighth example, the monitoring device may be mounted on the panel basket.

In a ninth example, a plating monitoring process may include:
- providing a plating equipment and a monitoring device including at least one agitation component;
- placing substrates into the plating equipment;
- performing plating process steps, wherein the plating process steps include:
  - mechanically agitating the at least one agitation component and the monitoring device;
- collecting agitation intensity data using the monitoring device; and
- transferring the collected agitation intensity data to a process control station;
wherein the monitoring device includes:
- a microcontroller,
- a metrology component,
- a power source; and
- a realtime connectivity component.

In a tenth example, mechanically agitating the at least one agitation component may include mechanically agitating the plating equipment with an equipment agitation system.

In an eleventh example, the agitation intensity data may include the vibration and/or acceleration of motion of the at least one agitation component.

In a twelfth example, the agitation intensity data may include the angular velocity of the at least one agitation component.

In a thirteenth example, the agitation intensity data may include the relative change of a magnetic field of the at least one agitation component.

In a fourteenth example, the plating process may include comparing the agitation intensity data with standard agitation intensity data to detect malfunctioning of the mechanical agitation.

In a fifteenth example, the plating process may include an electroless plating process.

In a sixteenth example, the plating equipment may include a material flight bar and the monitoring device may be mounted on the material flight bar; and the plating monitoring process may further include collecting the agitation intensity data at the material flight bar.

In a seventeenth example, the monitoring device may be mounted on the equipment agitation system; and the plating monitoring process may further include collecting the agitation intensity data at the equipment agitation system.

In an eighteenth example, the plating equipment may include a panel basket and the monitoring device may be mounted on the panel basket; and the plating monitoring process may further include collecting the agitation intensity data at the panel basket that is included in the plating equipment.

In a nineteenth example, there is provided a non-transitory computer readable medium including instructions that, if executed, cause one or more processors to receive agitation intensity data that are collected by a monitoring device mounted on a plating equipment during a plating process, compare the agitation intensity data with standard agitation intensity data, detecting a deviation of the received agitation intensity data from the standard agitation intensity data and preventing the plating process from proceeding.

In a twentieth example, the agitation intensity data are received by wireless transmission from a plurality of monitoring devices.

The properties of the monitoring device and the choice of plating equipment presented above are intended to be exemplary for the plating process. It will be apparent to those ordinary skilled practitioners that the foregoing process operations may be modified without departing from the spirit of the present disclosure.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

By "about" in relation to a given numerical value, such as for thickness and height, it is meant to include numerical values within 10% of the specified value.

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A monitoring system comprising:
   a plating equipment comprising a material flight bar, at least one agitation component that is configured to be mechanically agitated, and a monitoring device, the monitoring device being mounted on the agitation component and comprising:
      a metrology component configured to collect agitation intensity data,
      a microcontroller;
      a realtime connectivity component configured to transfer the collected agitation intensity data; and
      a power source; and
   a process control station configured to be coupled with the realtime connectivity component to receive the collected agitation intensity data.

2. The monitoring system of claim 1, the metrology component further comprising an accelerometer, a gyroscope and/or a magnetometer.

3. The monitoring system of claim 1, wherein the monitoring device is mounted on the material flight bar.

4. The monitoring system of claim 1, the plating equipment further comprising an equipment agitation system configured to mechanically agitate the plating equipment.

5. The monitoring system of claim 4, wherein the monitoring device is mounted on the equipment agitation system.

6. The monitoring system of claim 1, the plating equipment further comprising a panel basket.

7. The monitoring system of claim 6, wherein the monitoring device is mounted on the panel basket.

8. A plating monitoring process comprising:
   providing a monitoring device and a plating equipment comprising a material flight bar and at least one agitation component;
   placing substrates into the plating equipment;
   performing plating process steps, wherein the plating process steps comprise:
      mechanically agitating the at least one agitation component and the monitoring device;
   collecting agitation intensity data using the monitoring device; and
   transferring the collected agitation intensity data to a process control station;
wherein the monitoring device is mounted on the agitation component and comprises:
   a microcontroller,
   a metrology component,
   a power source; and
   a realtime connectivity component.

9. The plating monitoring process of claim 8, wherein mechanically agitating the at least one agitation component comprises mechanically agitating the at least one agitation component with an equipment agitation system.

10. The plating monitoring process of claim 9, wherein the monitoring device is mounted on the equipment agitation system; and
   wherein the plating monitoring process further comprises collecting the agitation intensity data at the equipment agitation system.

11. The plating monitoring process of claim 8, wherein the agitation intensity data comprises the vibration and/or acceleration of motion of the at least one agitation component.

12. The plating monitoring process of claim 8, wherein the agitation intensity data comprises the angular velocity of the at least one agitation component.

13. The plating monitoring process of claim 8, wherein the agitation intensity data comprises the relative change of a magnetic field of the at least one agitation component.

14. The plating monitoring process of claim 8, further comprising comparing the agitation intensity data with standard agitation intensity data to detect malfunctioning of the mechanical agitation.

15. The plating monitoring process of claim 8, wherein the plating process comprises an electroless plating process.

16. The plating monitoring process of claim 8, wherein the monitoring device is mounted on the material flight bar; and
   wherein the plating monitoring process further comprises collecting the agitation intensity data at the material flight bar.

17. The plating monitoring process of claim 8, wherein the plating equipment comprises a panel basket and the monitoring device is mounted on the panel basket; and
   wherein the plating monitoring process further comprises collecting the agitation intensity data at the panel basket that is comprised in the plating equipment.

* * * * *